United States Patent [19]

Eicher

[11] 4,310,166

[45] Jan. 12, 1982

[54] TRANSPORT APPARATUS ESPECIALLY FOR GOODS, CAPABLE OF TRAVELLING OVER STAIRS

[75] Inventor: Josef Eicher, Balgach, Switzerland

[73] Assignee: Cabo AG, Widnau, Switzerland

[21] Appl. No.: 72,005

[22] Filed: Jun. 4, 1979

[30] Foreign Application Priority Data

Sep. 5, 1978 [CH] Switzerland ............... 9325/78

[51] Int. Cl.³ ............................................. B62B 5/02
[52] U.S. Cl. ............................. 280/5.28; 280/47.24; 280/47.37 R; 280/39
[58] Field of Search ............... 280/5.2, 5.22, 5.24, 280/5.26, 5.28, 5.3, 5.32, 39, 47.37 R

[56] References Cited

U.S. PATENT DOCUMENTS

| | | | |
|---|---|---|---|
| 308,362 | 11/1884 | Hughes | 280/47.37 R |
| 314,185 | 3/1885 | Knowlton | 280/47.37 R |
| 355,192 | 12/1886 | Merrill | 280/47.37 R |
| 672,152 | 4/1901 | Ruher | 280/5.32 |
| 1,090,511 | 3/1914 | Adams | 280/39 |
| 2,651,525 | 9/1953 | Achee | 280/5.32 |
| 3,836,160 | 9/1974 | Linsley | 280/5.28 |

FOREIGN PATENT DOCUMENTS

| | | | |
|---|---|---|---|
| 39295 | 5/1955 | Poland | 280/5.2 |
| 266260 | 1/1950 | Switzerland | 280/5.2 |
| 6423 | of 1898 | United Kingdom | 280/5.32 |
| 689124 | 3/1953 | United Kingdom | 280/5.32 |
| 1098777 | 1/1968 | United Kingdom | 280/5.32 |

*Primary Examiner*—John P. Silverstrim
*Attorney, Agent, or Firm*—W. G. Fasse; D. F. Gould

[57] ABSTRACT

A transport apparatus having a loading bridge, is movable by hand for transporting loads over stairs. There are two front rollers (3), which are either extendable or variable in their angular position, and two rear rollers (7), which are secured to downwardly extending arms (6). The loading bridge (1) takes up a rearwardly tilted position when the transport apparatus rests with the rollers (3, 7) on a horizontal surface. The spacing between the front and rear rollers (3, 7) and the roller diameters are selected so that, when climbing a stair, the front rollers (3) rest on an upper tread while the rear rollers (7) simultaneously rest on a lower tread. When the apparatus is not in use, it may be folded to take up but a small space by folding the tiltable hand levers (14) inwardly and by tilting the arms (6) upwardly.

7 Claims, 13 Drawing Figures

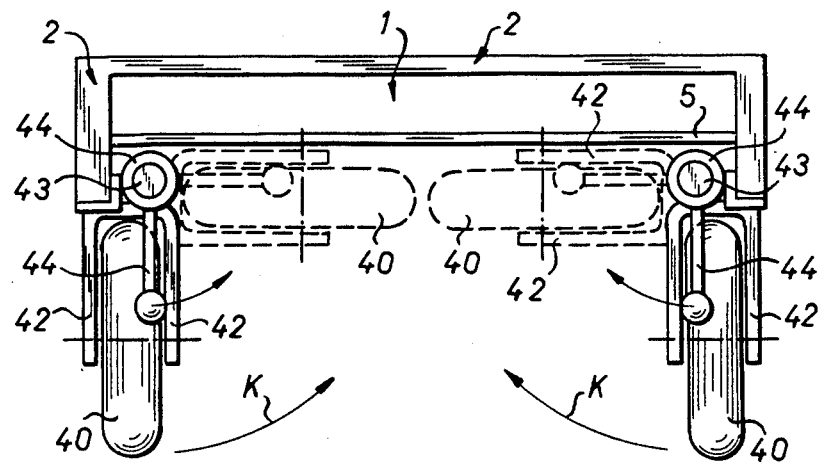
Fig. 11
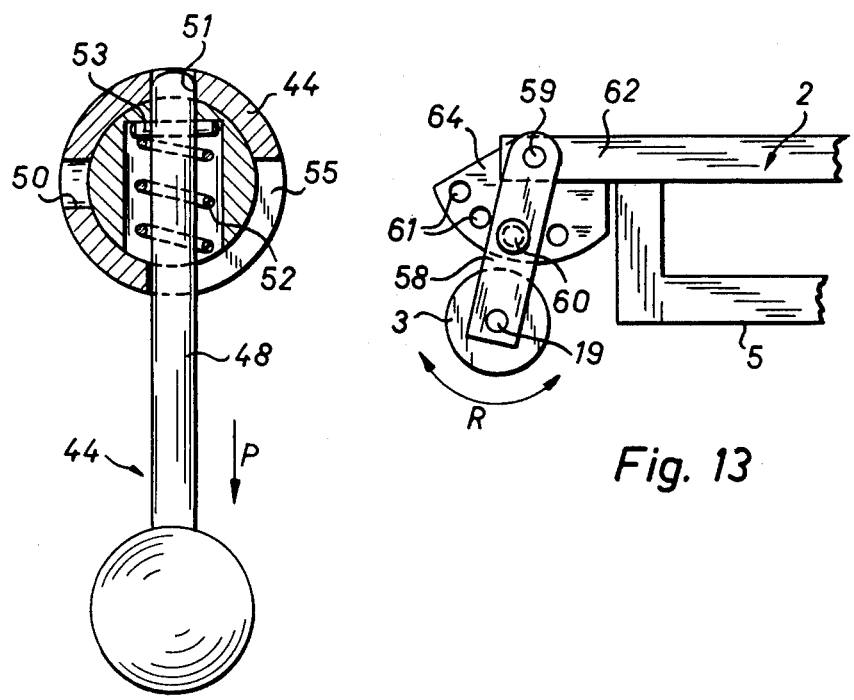
Fig. 12
Fig. 13

TRANSPORT APPARATUS ESPECIALLY FOR GOODS, CAPABLE OF TRAVELLING OVER STAIRS

The invention relates to a transport apparatus, especially for goods, comprising a loading bridge and several rollers intended for contacting the ground.

Numerous transport devices for goods and persons are already known which devices may be pushed by hand but have the disadvantage that they are not usable for transporting heavy loads over stairs. The objective to be achieved by the present invention is to provide a transport apparatus which is pushable by hand and which is as simple as possible and light, yet, which may be used for transporting comparably heavy loads in a simple manner over stairs. The apparatus shall be suitable in the same manner for the transport on streets and walks.

The invention which achieves the foregoing objectives may be ascertained from the characterizing clause of patent claim 1.

These features make it possible to transport even relatively heavy loads by a single man over stairs and walks in a relatively simple manner and with a comparably small effort.

Example embodiments of the invention are illustrated in the drawings.

FIG. 11 is a rear view of the transport apparatus according to FIG. 10;

FIG. 12 is a sectional view through the adjusting mechanism for the wheels with pneumatic tires;

FIG. 13 illustrates a view of a modification for the tiltability of the front rollers.

Figure 1:
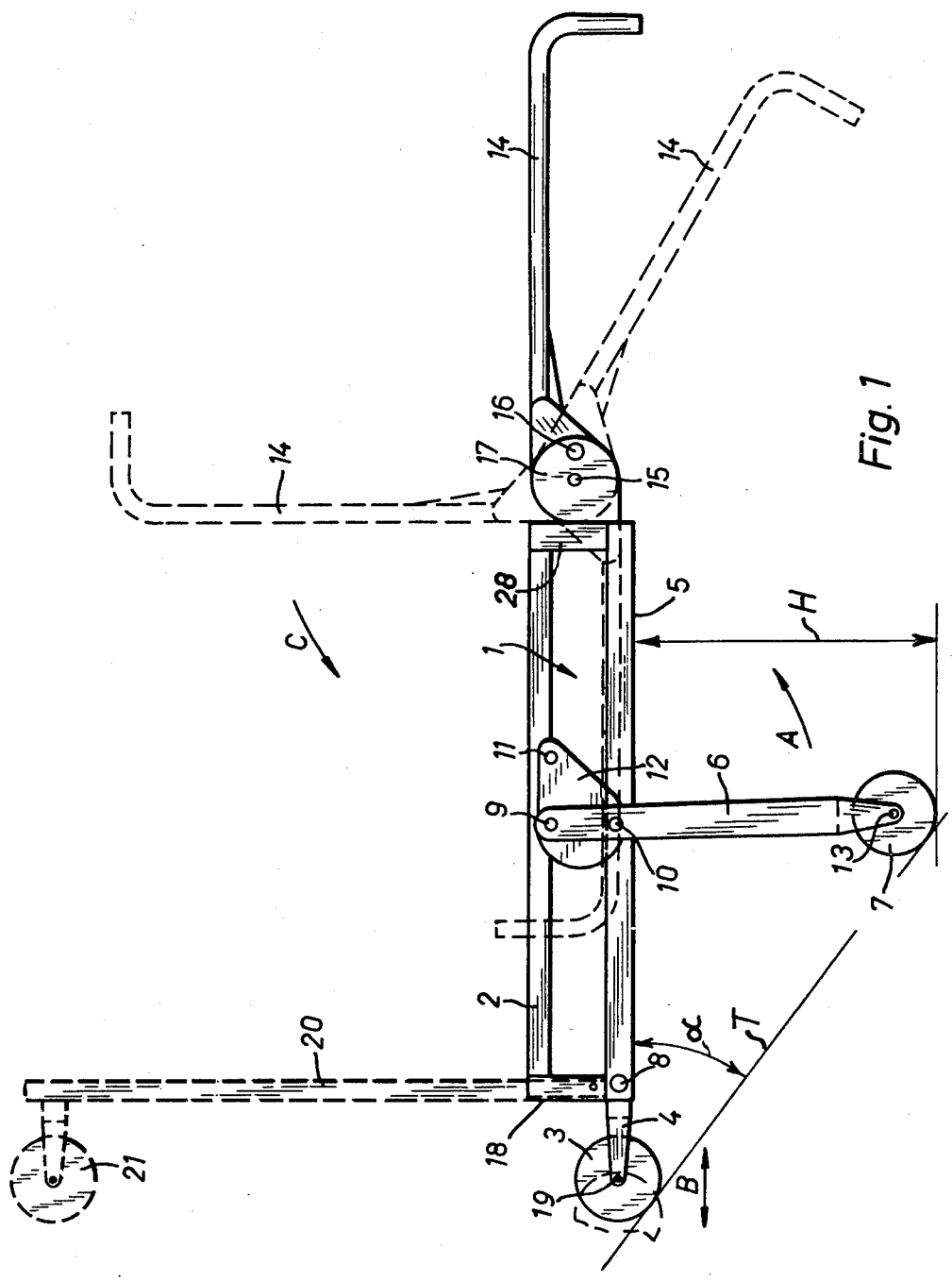
FIG. 1 shows a side view of the transport apparatus.
Figure 2:
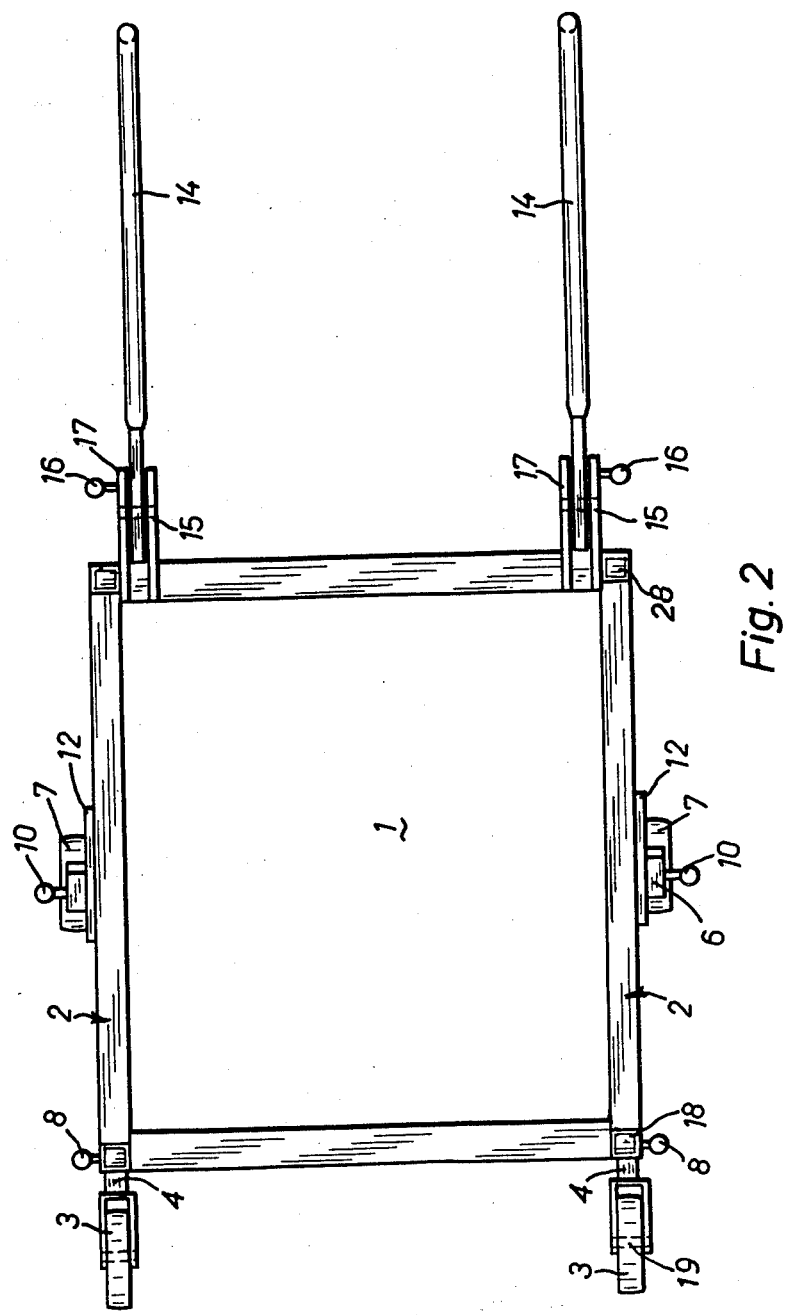
FIG. 2 is a top plan view of the transport apparatus.

The transport apparatus is preferably intended for the transport of the goods. However, it is also suitable for transporting walk handicapped persons by installing a seat. This transport apparatus which may be pulled or pushed by hand is suitable for transporting bags, boxes as well as office equipment, refrigerators, and persons easily by one man on walkways as well as over stairs.

The transport apparatus according to FIGS. 1 to 4, comprises a loading bridge 1 surrounded by a frame 2. On the front side of the loading bridge 1 there are secured two rotatable rollers 3 each to its respective support 4 which is extendable in parallel to the loading bridge in the direction of the arrow B. In the middle zone of the loading bridge 1 there is arranged on arm 6 on each side, which extends relative to the floor 5 of the loading bridge 1 substantially at a right angle downwardly and which is provided with a rotatable roller 7 at the lower end. The point of securing the arms 6 to the frame 2 is located in the area of the middle one third of the loading bridge 1. The arms 6 may, however, be somewhat off-set in their lower portion (see FIG. 10), in order to better reach underneath of a corbelled stair tread.

The arms which are tiltable about an axis 9, are arrested in the lowered down position illustrated in FIG. 1 by bolts 10. By loosening the bolts 10 the arms 6 may be tilted in the direction of the arrow A into a nonoperating position. In this upwardly turned position the bolt 10 engages into a second bore 11 of a mounting gusset 12 welded to the frame 2. The two front rollers 3 reach above the front side of the loading bridge 1 and extend below the bottom 5 of the loading bridge. The roller support brackets 4 are made of square sectional steel and extend into a corresponding hollow sectional member of the frame 2. These brackets 4 are individually extendable in the direction of the double arrow B. As a modified embodiment it would be possible to arrange but one single roller 3 centrally at the front end of the loading bridge. The rollers 7 may also be provided with brakes.

Figure 3:
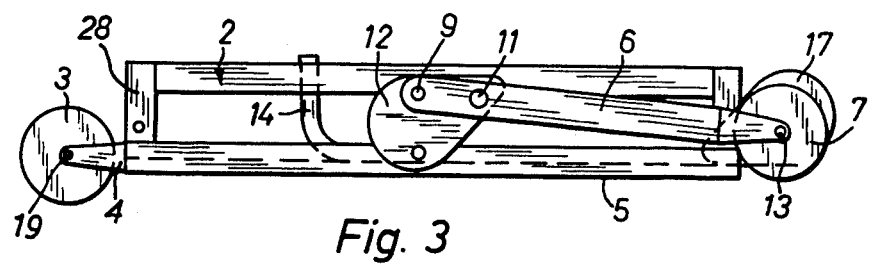
FIG. 3 is a side view of the transport apparatus in its folded condition.
Figure 4:
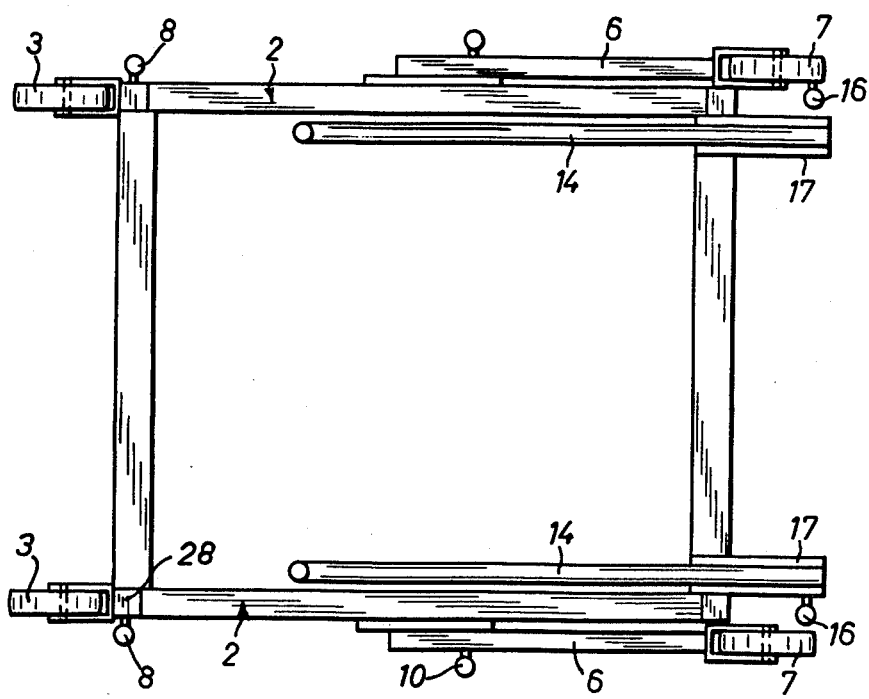
FIG. 4 is a top plan view of the transport apparatus in its folded condition.

Two rod type rearwardly extending hand levers 14 are mounted to the rear end of the loading bridge 1 by means of two holding straps 17 welded to the frame 2. The hand levers 14 are tiltable about the horizontal axes 15. These hand levers 14 may be arrested in different tilted positions by means of a bolt 16 which may reach into bores in the holding straps 17. This is shown in dashed lines. In the folded, space-saving condition of the transport apparatus as shown in FIGS. 3 and 4, these hand levers 14 may be folded into the inside of the loading bridge 1. In the folded-in condition the hand levers 14 do not extend outside the length of the loading bridge 1.

The frame 2 is constructed so that the upwardly extending post 18, 28 may comprise hollow square sectional tubing 18. If desired, a carrier plate 20 with wheels 21 may be inserted into the two forward posts 18. The carrier plate 20 comprises a metal frame into which there is inserted a board or the like. This removably inserted carrier plate 20 prevents loads from sliding out forwardly when the transport apparatus is in a steep position. The arms 6 may also be constructed for longitudinal adjustment. As shown in FIGS. 3 and 4, it is possible to fold this transport apparatus so that it takes up but little space. This is accomplished by upwardly tilting the arms 6 secured to the outside of the frame, in the direction of the arrow A and folding the handles 14 secured to the inside of the frame, in the direction of the arrow C. This is especially possible because the arms 6 are not interconnected by a rod extending through underneath. Thus, it is possible to easily carry the transport apparatus by hand if it is not in use and it takes up but little space. The carrier plate 20 may be withdrawn from both posts 18 and may be taken along as a separate part.

In order to make this transport apparatus capable of negotiating a stair, the spacing "a" between the rotational axes of the front and rear wheels 3, 7 shall be 40 to 70 cm, preferably 50 to 60 cm. The clearance H above ground shall be 30 to 45 cm, preferably about 35 cm. Further, the roller diameter shall be smaller than 15 cm, preferably about 6 to 9 cm. A tangent T applied to the front and rear wheels 3, 7 shall include with the bottom 5 an angle in the range between 25° to 50°, preferably 30° to 40°, whereby the roller support brackets 4 take up their recessed position.

Figure 5:
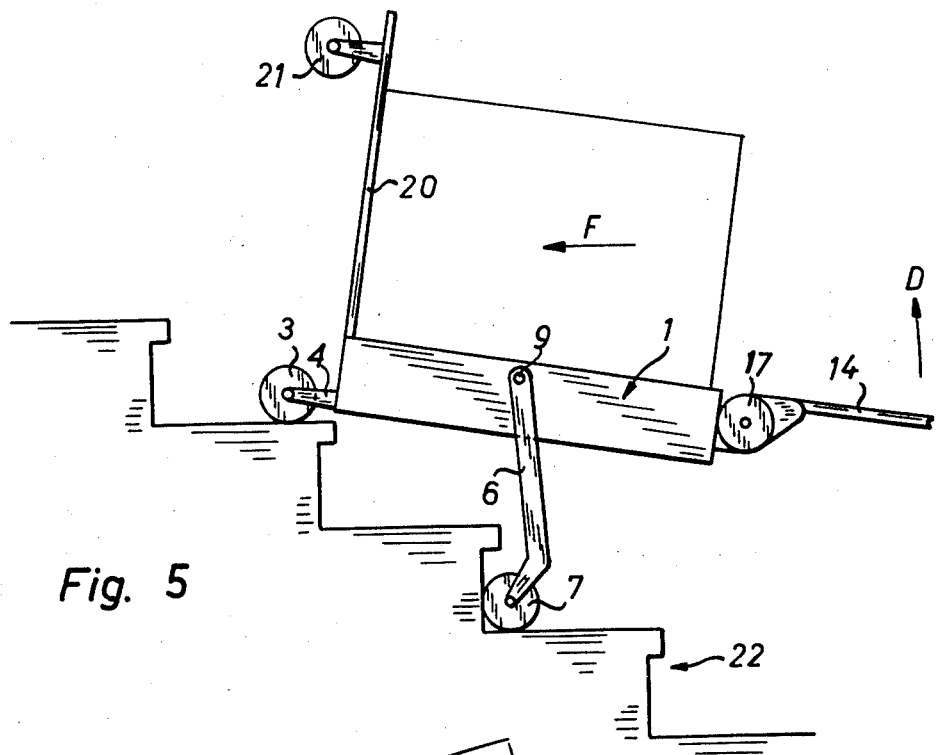
FIG. 5 shows the transport apparatus in a schematic illustration when ascending a stair in a first phase.
Figure 6:
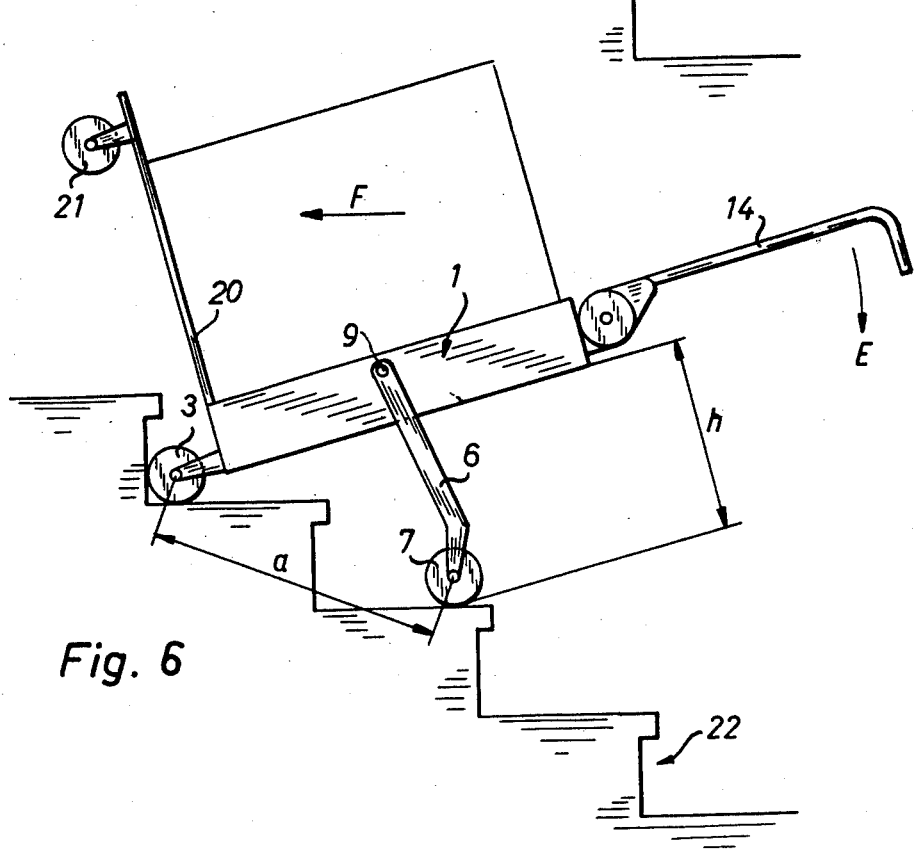
FIG. 6 shows the transport apparatus when ascending a stair in a second phase.

As shown in FIG. 5, the transport apparatus, in order to negotiate a stair 22, is positioned so that the front rollers 3 rest on an upper step. The rear rollers 7 initially rest on the next but one lower tread. The transport apparatus is shifted in the direction of the arrow F to such an extent that the rear rollers 7 are about to contact the riser of the next stair step. Thus, the front rollers 3 as well as the rear rollers 7 simultaneously rest on different stair steps. Depending on the size of the riser and tread of the step, the loading bridge 1 will take up a substantially horizontal or slightly rearwardly tilted position. Thereafter the transport apparatus is lifted by hand by lifting the hand levers 14 in the direction of the arrows D whereupon they are moved forwardly in the direction of the arrow F until the position is accomplished which is shown in FIG. 6. In this position the front rollers 3 rest on an upper stair tread and the rear rollers 7 simultaneously rest on the next lower stair tread. Thereafter the transport apparatus is pressed downwardly by hand with its hand levers 14 in the direction of the arrow E and again pushed in the direction of the arrow F, whereby again the position is accomplished which is shown in FIG. 5, however, now relative to a higher tread position. In this manner the goods to be transported may be easily moved up or down a stair while utilizing the lever effect with little force.

When the goods are transported on a horizontal surface, and thus the rollers 3, 7 rest on the floor, the loading bridge takes up a rearwardly slanted position with an angle ($\alpha$) preferably about 35°.

Normal stair treads have a riser height of about 18 cm and a tread depth of about 28 cm. In order to adapt the apparatus to different tread deths, the roller support brackets 4 and the rollers 3 secured thereto are extendable. In the selected, extended position the arresting is accomplished by means of an arresting bolt 8 which enters into bores in the brackets 4. When climbing a circular stair, it is suitable to extend the two brackets 4 to different extents.

Where narrow space conditions prevail, for example, when moving into an elevator or the like it is possible to tilt the arms upwardly and to move the hand levers 14 into different positions as shown, for example in FIG. 1 by the dashed lines.

In the folded condition the transport apparatus is only slightly larger than the loading bridge 1 proper including the frame 2.

Figure 7:
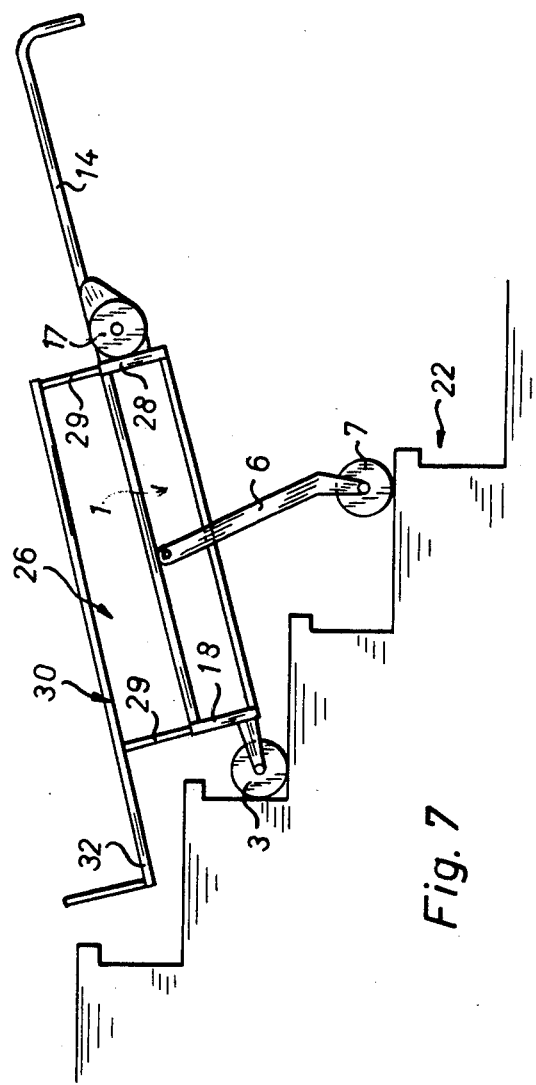
FIG. 7 is a side view of the transport apparatus with an attached frame for the transport of long goods.

FIG. 7 illustrates a modified embodiment of the transport apparatus in which an additional plug-in frame 26 is attached to the frame 2. This version is especially suitable for the transport of long goods. Four downwardly reaching studs 29 are removably inserted into the four corner posts 18, 28 of the frame 2. The studs 29 carry at the upper ends thereof a platform type support surface 30. The front portion 32 of the support surface extends over the front rollers 3 to about one quarter of the length of the loading bridge 1. When the apparatus is not in use the plug-in frame 26 may be removed as a unit.

Figure 8:
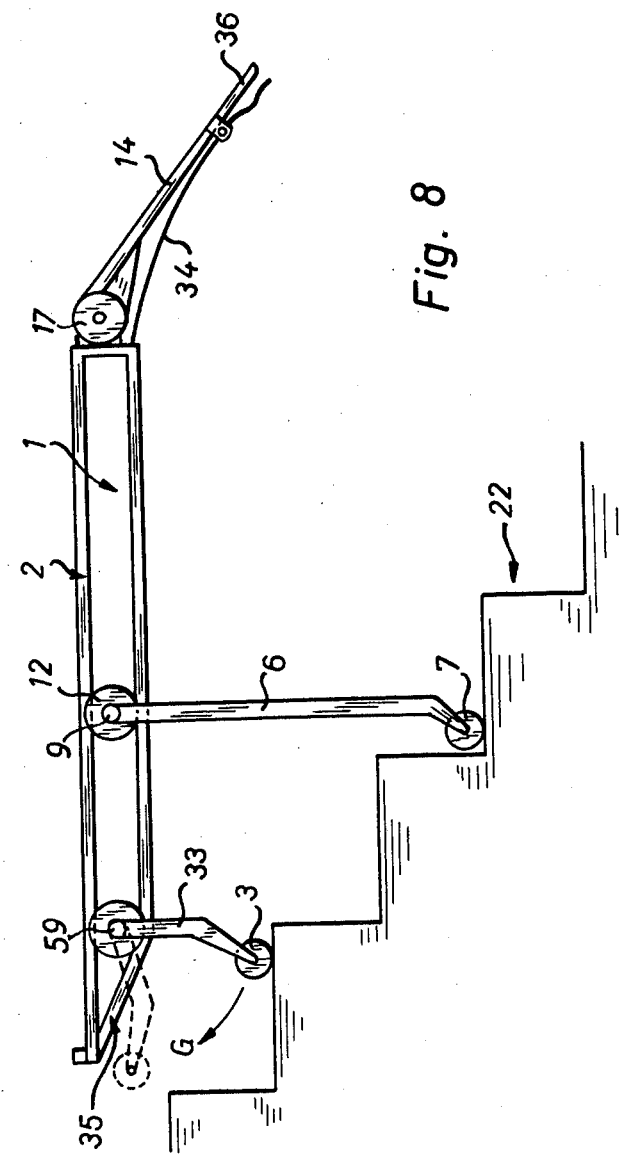
FIG. 8 is a side view of a modified embodiment of the transport apparatus in which the front rollers are secured to tiltable arms.
Figure 9:
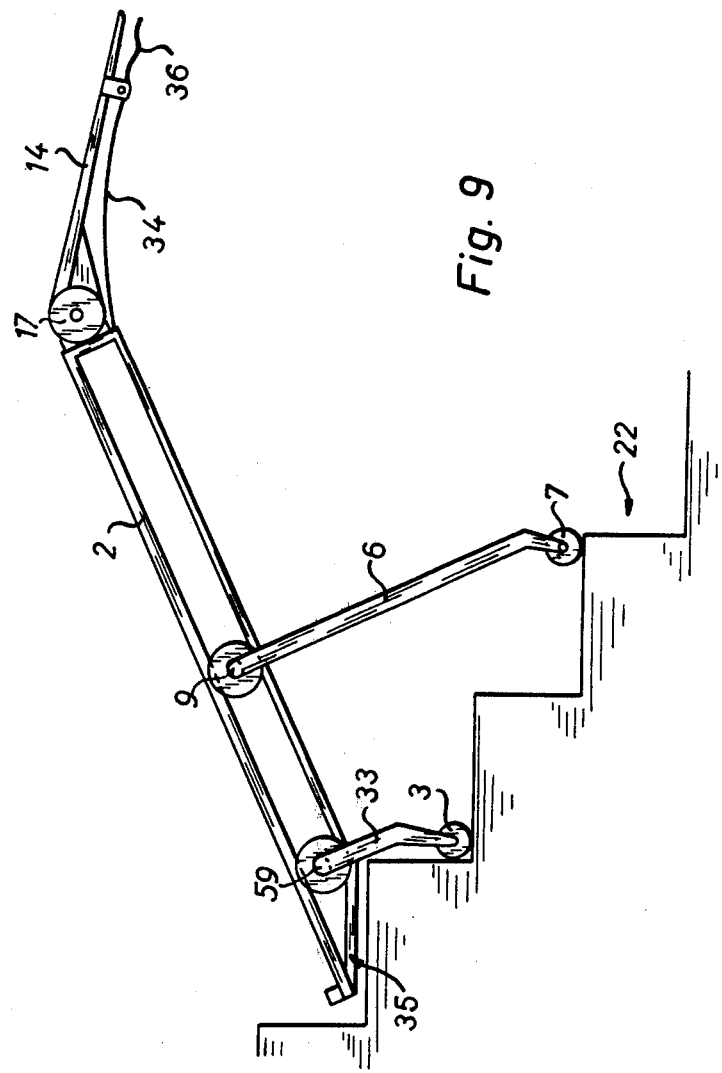
FIG. 9 is a side view of the transport apparatus according to FIG. 8 in another position.

FIGS. 8 and 9 show a further embodiment of the transport apparatus especially adapted for relatively large and heavy goods. Contrary to the embodiment according to FIGS. 1 to 7, the two front rollers 3 are not extendable but rather secured to tiltable arms 33. These arms 33 are arrested in the downwardly extending position shown in full lines. The arresting may be released by means of a pull cable 34 or the like extending from the handles 36. Thus, the front arms may be tilted upwardly in the direction of the arrow G into the position illustrated by dashed lines in which they rest against a stop. In this embodiment the arms 6 are longer than in the embodiment according to FIGS. 1 to 7, to an extent corresponding about to the length of the arms 33. The frontmost part of the loading bridge 1 is slanted upwardly by about 20° so that a nose 35 is formed which facilitates the loading and unloading of the goods to be transported. In addition the nose 35 makes possible a larger freedom of movement when lifting from one stair step to the other as illustrated in FIg. 9. Otherwise, the structure and function correspond to those of the first described example embodiment.

Figure 10:
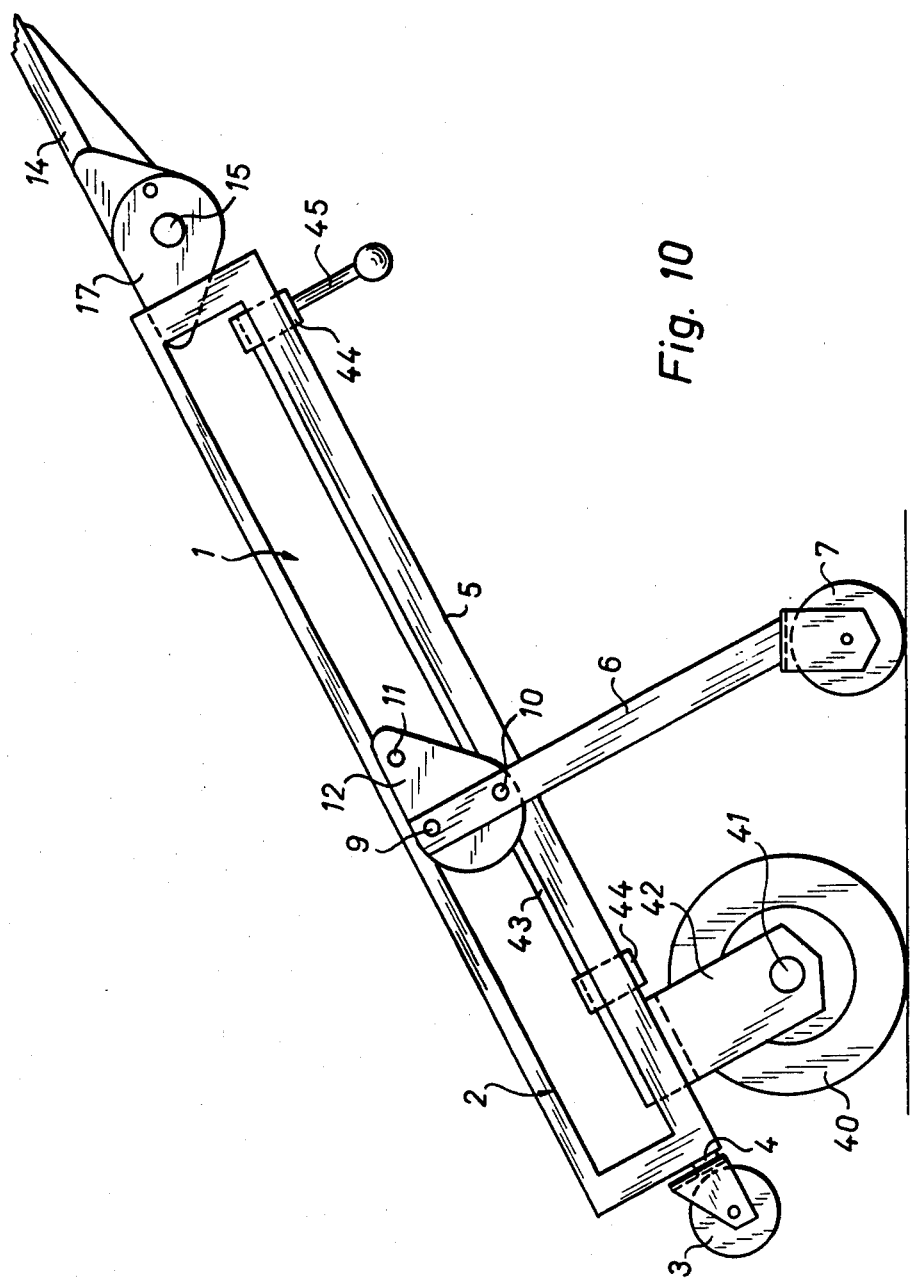
FIG. 10 is a side view of a further modification of the transport apparatus having two additional wheels with pneumatic tires.

FIGS. 10 and 11 illustrate an embodiment of the transport apparatus which, starting from the apparatus according to FIGS. 1 to 4 is additionally equipped with two wheels 40 with pneumatic tires which may be used selectively. These wheels 40 with pneumatic tires have a substantially larger diameter than the wheels 3 or 7, that is a diameter of about 15 to 30 cm, preferably 20 cm. With the aid of these wheels 40 with pneumatic tires it is possible to transport loads also over larger distances and over rough surfaces substantially in a shock absorbent manner. Each wheel axle 41 is supported by a wheel fork 42. These wheel forks 42 are each rigidly secured to a rod 43 which is tiltable through an angle of about 90°. The two rods extending in parallel to each other are held below the bottom 5 in rings 44 or in pipe sections welded to the frame 2. The wheels with pneumatic tires may be tilted by means of a respective stop lever 45 secured at the rear end of the loading bridge 1, whereby the wheels may take up an operating position as shown in full lines in FIGS. 10 and 11 or a rest position as shown in dashed lines in FIG. 11.

When each of the stop levers 44 is tilted through an angle of about 90°, the wheels 40 with pneumatic tires move oppositely relative to each other in the direction of the arrows K so that thereafter the wheels rest below the bottom 5 and about in parallel thereto.

As shown in FIG. 12 the stop lever 44 arrests the rod 43 and thus the wheels with pneumatic tires in the operating position and in the rest position. The end of the lever 48 reaches selectively in one of the two bores 50, 51 which are displaced by about 90°. In each position the lever 48 is secured by the pressure of a spring 52 which presses against a pin 53 in the lever 48. By moving the lever 48 by hand in the direction of the arrow P the lever disengages the bore 50 or 51 whereupon it may be tilted into another position. The lever 48 is guided in a slot 55 of the ring 44.

FIG. 13 illustrates a modified embodiment in which the two front rollers are secured to the frame 2 by means of two tiltable supports 58 instead of on extendable supports 4. The supports 58 are tiltably secured ot an upper strut 62 of the frame 2 by means of a respective bolt 59, whereby the supports 58 may be tilted in the direction of the double arrow R depending on the dimensions of stair steps at hand. The angular position of the support 58 is fixed by an arresting pin 60 which may engage into one of several bores 61 of an aperture plate 64 welded to the frame. In this embodiment the roller 3 also extends below the bottom 5 and is arranged in front of the frame.

A further modification exists in that the supports 58 are insertable into the aperture plate 64 in different angular positions, whereby depending on the desired slant of the supports 58 different bores are utilized.

Besides, it would be possible to construct the arms 6 to be removable rather than tiltable, for example, by means of a nut and bolt connection.

I claim:

1. A transport apparatus comprising: loading bridge means (1) including a floor (5) and a frame (2) surrounding said floor, at least two front roller means (3) and at least two rear roller means (7), load bearing arm means (6) extending downwardly from each side of the loading bridge means (1), means pivotally mounting said load bearing arm means to said loading bridge means within approximately the middle third of the length of the loading bridge means (1), for angular movement of the load bearing arm means (6) over at least approximately 90° between a downward position at substantially right angles from the loading bridge means and an upward storage position, said rear roller means (7) being mounted at the outer ends of said load bearing arm means (6), at least two lever arm means mounted at the front end of the loading bridge means and extendable and retractable from the front end of the loading bridge means substantially in parallel relative to the floor (5) of said loading bridge means (1), said respective lever arm means being separately individually extendable and retractable, said front roller means (3) being mounted at the ends of said respective lever arm means, said loading bridge means being oriented at an angle with the ground directed upwardly toward the rear when the transport apparatus is placed on a horizontal surface, and wherein the spacing (a) between the front and rear roller means (3,7) and the diameter of the roller means are so selected that upon transport up a set of stairs (22) the front roller means (3) come to rest on an upper stair tread while the rear roller means (7) may simultaneously rest on a lower stair tread, at least two handle arm means (14) mounted at the rear end of the frame (2), each of said handle arm means being separately individually pivotable about a horizontal axis (15) and means for arresting said handle arm means in different positions, thereby to facilitate maneuvering of the transport apparatus.

2. Transport apparatus according to claim 1, wherein the spacing between the front and rear roller means (3,7) is within the range of approximately 40 cm to 70 cm, and preferably 50 cm to 60 cm, wherein the diameter of the roller means (3,7) is smaller than 15 cm, wherein the angle ($\alpha$) defined between the tangent (T) to the roller means (3,7) and the floor (5) of the loading bridge means (1) is within the range of approximately 25° to 50° and preferably 30° to 40°, and wherein the length of the load bearing arm means (6) is selected so that the clearance (H) of the floor (5) above the ground is approximately 25 cm to 45 cm and preferably about 35 cm.

3. Transport apparatus according to claim 1, wherein said frame (2) of the loading bridge means comprises at its front end, receiving means (18) extending upwardly substantially at right angles from the floor (5), and further comprising platform means (20) provided with additional roller means (21), said platform means being removably held in said receiving means.

4. Transport apparatus according to claim 1, wherein said handle arm means have a length shorter than the length of said loading bridge means, said handle arm means being foldable onto the loading bridge means (1).

5. Transport apparatus according to claim 1, further comprising at least two collapsible wheel means (40) having a larger diameter than said front and rear roller means, said larger diameter wheel means being mounted between the front and rear roller means, each of the larger wheel means being collapsible inwardly through an angle of approximately 90° from a working position, rod means (43) extending longitudinally along the length of the transport apparatus, said wheel means pivotally mounted on said rod means for collapsing inwardly, and arresting means (48, 50, 51) for securing the wheel means in at least either the working or collapsing positions (FIGS. 10, 11).

6. Transport apparatus of claim 1, wherein said loading bridge means comprises frame extending means (30) extending over and beyond the front roller means (3) when the loading bridge is viewed in a horizontal position thereby enabling long dimension goods to be held and transported (FIG. 7).

7. Transport apparatus according to claim 1, further comprising frame extending means (30) including stud means (29) for removably securing said frame extending means (30) to said frame (2), said frame (2) including coupling means (18, 28) interfitting with said stud means.

* * * * *

UNITED STATES PATENT AND TRADEMARK OFFICE
CERTIFICATE OF CORRECTION

PATENT NO. : 4,310,166
DATED : January 12, 1982
INVENTOR(S) : Josef Eicher

It is certified that error appears in the above—identified patent and that said Letters Patent is hereby corrected as shown below:

On the title page, filing date should read:

-- September 4, 1979 --.

Signed and Sealed this

Thirtieth Day of March 1982

[SEAL]

Attest:

Attesting Officer

GERALD J. MOSSINGHOFF

*Commissioner of Patents and Trademarks*